(12) United States Patent
Yoshino et al.

(10) Patent No.: US 7,738,161 B2
(45) Date of Patent: Jun. 15, 2010

(54) WAVELENGTH CONVERTING DEVICES

(75) Inventors: Takashi Yoshino, Ama-gun (JP); Shoichiro Yamaguchi, Ichinomiya (JP)

(73) Assignee: NGK Insulators, Ltd., Nagoya (JP)

( * ) Notice: Subject to any disclaimer, the term of this patent is extended or adjusted under 35 U.S.C. 154(b) by 558 days.

(21) Appl. No.: 11/682,557

(22) Filed: Mar. 6, 2007

(65) Prior Publication Data

US 2007/0223081 A1   Sep. 27, 2007

(30) Foreign Application Priority Data

Mar. 10, 2006 (JP) .............................. 2006-066038

(51) Int. Cl.
*G02F 2/02* (2006.01)
*G02B 6/10* (2006.01)

(52) U.S. Cl. .................. 359/326; 385/122; 385/130

(58) Field of Classification Search ......... 359/326–330; 385/122, 129–132
See application file for complete search history.

(56) References Cited

U.S. PATENT DOCUMENTS

| | | | |
|---|---|---|---|
| 5,138,687 A | 8/1992 | Horie et al. | |
| 5,511,142 A | 4/1996 | Horie et al. | |
| 5,866,200 A | 2/1999 | Yoshino et al. | |
| 6,631,231 B2 * | 10/2003 | Mizuuchi et al. | ............ 385/122 |
| 7,373,065 B2 * | 5/2008 | Yamaguchi et al. | ......... 385/129 |
| 7,512,303 B2 * | 3/2009 | Catching et al. | ............ 385/131 |
| 2002/0051282 A1 | 5/2002 | Tsuruma | |
| 2006/0109542 A1 | 5/2006 | Mizuuchi et al. | |
| 2007/0189689 A1 | 8/2007 | Yamaguchi et al. | |

FOREIGN PATENT DOCUMENTS

| | | |
|---|---|---|
| JP | 03-110505 A1 | 5/1992 |
| JP | 05-289133 A1 | 11/1993 |
| JP | 09-269430 A1 | 10/1997 |
| JP | 2002-139755 A1 | 5/2002 |
| JP | 2003-140214 A1 | 5/2003 |
| JP | 2003-177263 A1 | 6/2003 |
| JP | 2004-219751 A1 | 8/2004 |
| JP | 2006/041172 A1 | 4/2006 |

OTHER PUBLICATIONS

Co-pending U.S. Appl. No. 11/717,588, filed Mar. 13, 2007, Yoshino et al.

* cited by examiner

*Primary Examiner*—Hemang Sanghavi
(74) *Attorney, Agent, or Firm*—Burr & Brown

(57) ABSTRACT

A wavelength converting device has a substrate made of an electro-optic material and converts a wavelength of a fundamental light to oscillate a converted light. A wavelength converting portion is provided in the substrate and has a cross sectional area of 0.0001 $mm^2$ or larger and 0.01 $mm^2$ or smaller. A pair of thinner portions are provided in both sides of the wavelength converting portion, respectively, and thinner than the wavelength converting portion.

9 Claims, 4 Drawing Sheets

WAVELENGTH CONVERTING DEVICES

BACKGROUND OF THE INVENTION

1. Field of the Invention

The invention relates to a wavelength converting device such as an SHG device.

2. Related Arts

Non-linear optical crystals, such as lithium niobate or lithium tantalite, have a high second-order non-linear optical constant. It is thus possible to realize a quasi-phase matched (QPM) type second harmonic generation (SHG) device, by providing a periodic polarization domain inversion structure in the crystal. Further, an SHG device of a high efficiency can be realized by forming a waveguide in the periodic polarization domain inversion structure, and the device finds a wide variety of applications such as optical communication, medical uses, optochemical uses, various optical measurements, etc.

The applicant disclosed a process of producing a ridge-shaped optical waveguide used for a device for generating second harmonic wave, in Japanese Patent publication H09-269430A. The waveguide is formed by subjecting an oxide single crystal to ablation working using an excimer laser. Such oxide single crystal includes lithium niobate and a lithium niobate-lithium tantalate solid solution.

SUMMARY OF THE INVENTION

However, according to prior SHG devices, the material forming the periodic polarization inversion structure has the limit on the resistance against optical damage. It is proved to be difficult to oscillate converted light of a high output power of, for example, 1 W or more. For example, in the case that a periodic polarization domain inversion structure is formed in a ridge-type optical waveguide as described in Japanese patent publication H09-269430A, the conversion efficiency can be improved. However, for example as an SHG output power of 200 mW or more, optical damage may be induced. It has thus been presented a fundamental problem that it is difficult to improve the optical output over a specific range.

On the other hand, for example, fundamental light can be made incident into a bulk substrate of MgO-doped lithium niobate single crystal to oscillate second harmonic wave. According to this method, the optical damage of the single crystal can be reduced, because the cross sectional area can be made larger to avoid a considerable increase of the power density per a unit cross sectional area. However, different from a waveguide-type harmonic wave oscillating device, there is a upper limit of the conversion efficiency. It is thus necessary to prepare a light source of a considerably high power, which is not practical.

An object of the present invention is to provide a wavelength converting device utilizing a periodic domain inversion structure in which optical damage of the material can be prevented and the conversion efficiency can be improved to enable the stable oscillation of harmonic wave of a large output power.

The present invention provides a wavelength converting device comprising a substrate comprising an electro-optic material and for converting a wavelength of a fundamental light to oscillate a converted light, said device comprising:

a wavelength converting portion provided in said substrate and having a cross sectional area of 0.0001 mm$^2$ or larger and 0.01 mm$^2$ or smaller; and a pair of thinner portions provided in both sides of said wavelength converting portion, respectively, and thinner than said wavelength converting portion.

The prevent inventors have reached the idea of forming a pair of thinner portions in a substrate of a bulk-shaped electro-optical material and of forming a wavelength converting portion having a cross sectional area of 0.0001 mm$^2$ or larger and 0.01 mm$^2$ or smaller between them. The cross sectional area of 0.0001 mm$^2$ corresponds with 100 μm$^2$ (length of 10 μm and width of 10 μm). The converting portion defined by this area does not generally have a function of a channel optical waveguide and single mode propagation. However, in the case that a periodic domain inversion structure is formed in the converting portion, a higher output power can be obtained compared with a waveguide-type harmonic wave oscillating device as a whole, thanks to a larger cross sectional area.

On the other hand, according to a device of propagating light in a substrate of an electro-optic material to oscillate harmonic wave, there is a limit on the conversion efficiency of the fundamental light to the harmonic wave. Contrary to this, according to the present invention, although the size of the wavelength converting portion is near that of the bulk, it is found that the conversion efficiency can be considerably improved compared with that of the bulk shaped wavelength converting device. The present invention is thus made.

DETAILED DESCRIPTION OF THE INVENTION

Figure 1:
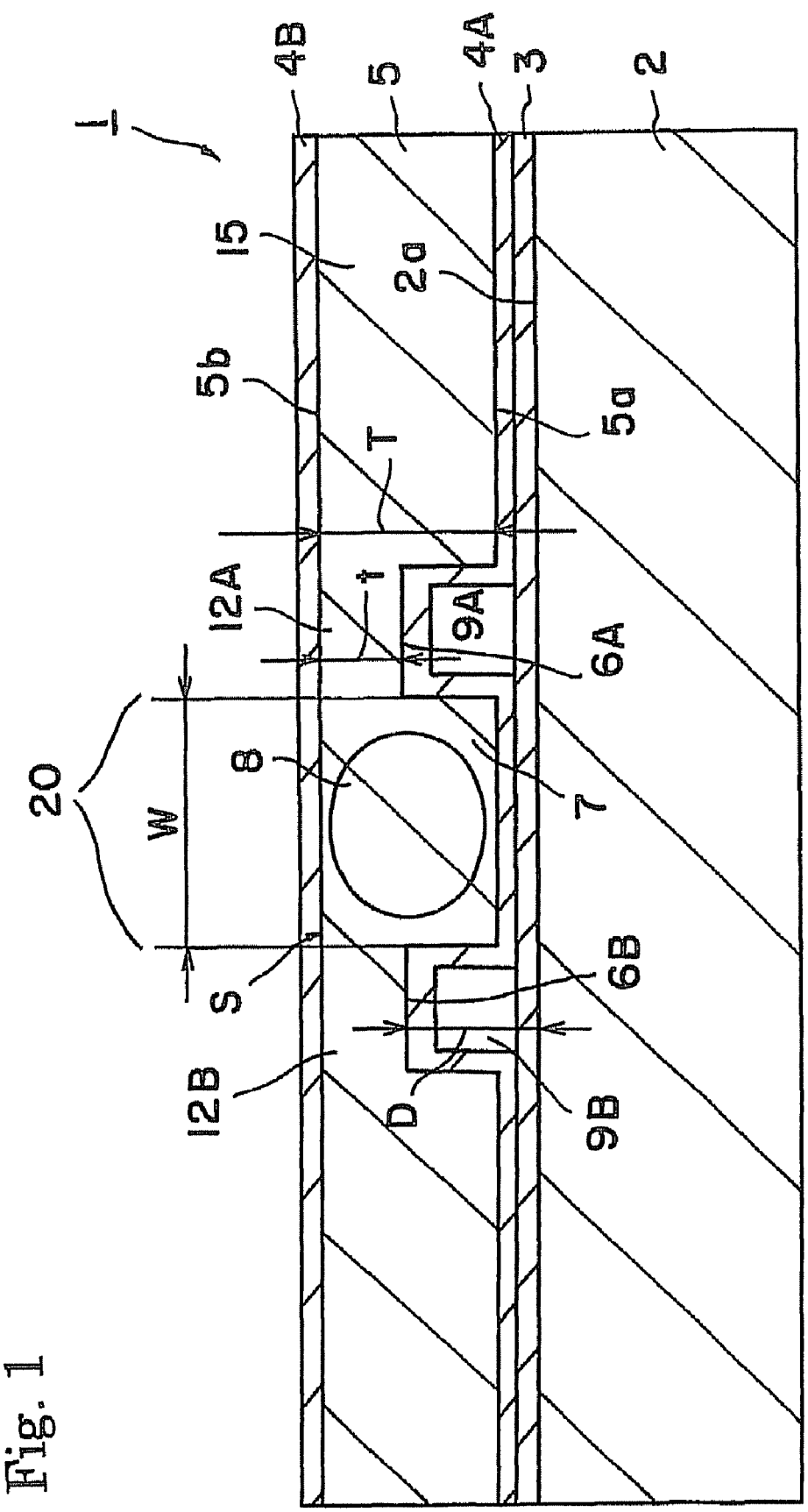
FIG. 1 is a cross sectional view schematically showing a device 1 according to one embodiment of the present invention.

FIG. 1 is a cross sectional view schematically showing a wavelength converting device 1 according to one embodiment of the present invention. Buffer layers 4A and 4B are formed to cover main faces 5a and 5b, respectively, of a substrate 5 of an electro-optic material. For example, a pair of grooves 6A and 6B are formed in the substrate 5, and a wavelength converting portion 7 is formed between the grooves 6A and 6B. Spaces 9A and 9B are formed in the grooves 6A and 6B, respectively. Thinner portions 12A and 12B are formed on the both sides of the wavelength converting portion 7. Additional portions 15 are provided in the outsides of the thinner portions, respectively. The spaces 9A and 9B may be a space filled with air, or may be vacuum, or may contain a low dielectric material as described later. A supporting body 2 is adhered to a main face 5a of the substrate 5 through an adhesive layer 3. 20 represents a wavelength converting region.

Figure 2:
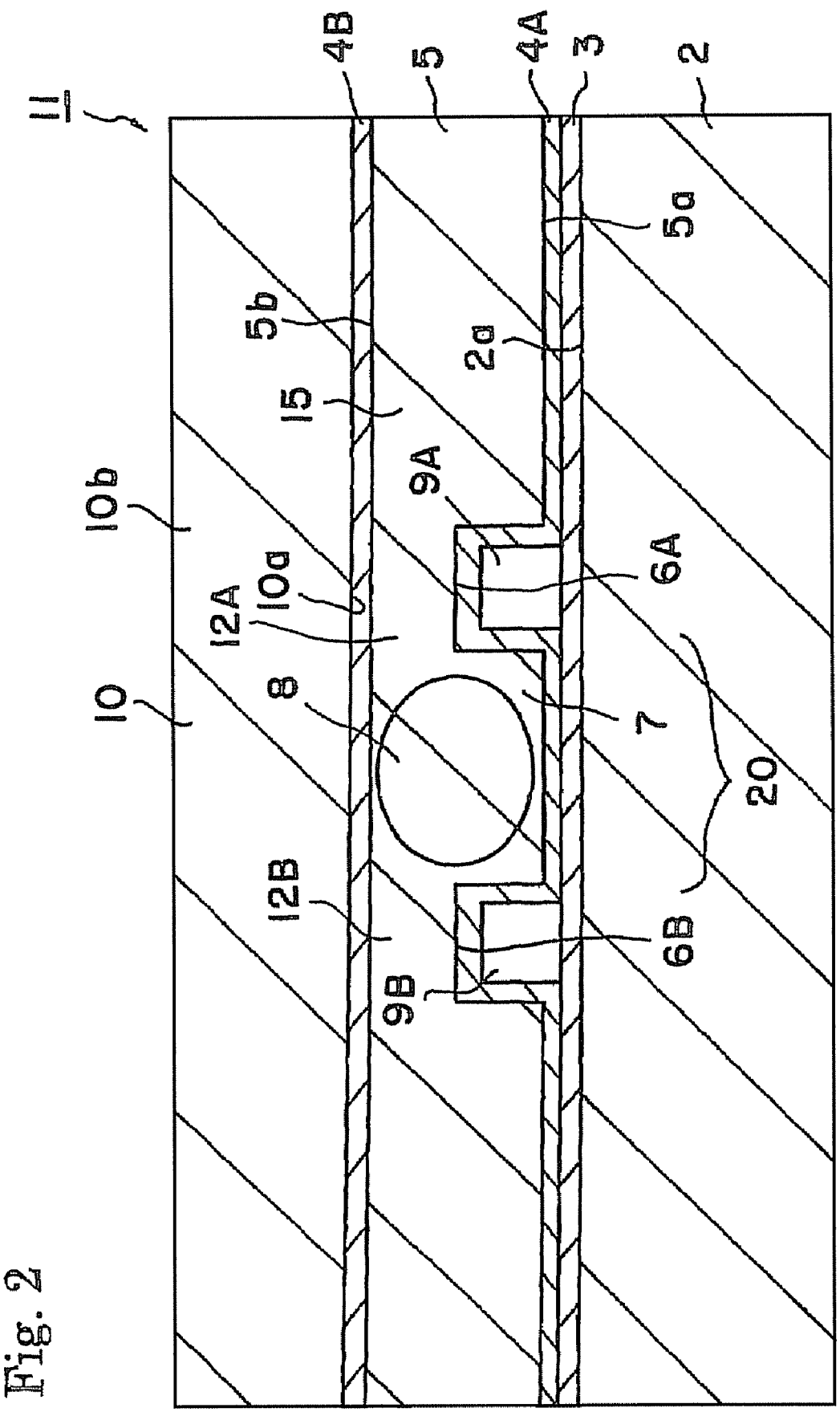
FIG. 2 is a cross sectional view schematically showing a device 11 according to another embodiment of the present invention.

FIG. 2 is a cross sectional view schematically showing a wavelength converting device 11 according to another embodiment of the present invention. Buffer layers 4A and 4B are formed to cover main faces 5a and 5b, respectively, of a substrate 5 of an electro-optic material. For example, a pair of grooves 6A and 6B are formed in the substrate 5, and a wavelength converting portion 7 is formed between the grooves 6A and 6B. Spaces 9A and 9B are formed in the grooves 6A and 6B, respectively. The spaces 9A and 9B may be a space filled with air, or may be vacuum, or may contain a low dielectric material as described later. A supporting body 2 is adhered a main face 5a of the substrate 5 through an adhesive layer 3. A main face 10a of a clad body 10 is adhered with the main face 5b of the substrate 5. 10b represents its upper main face.

Figure 3:
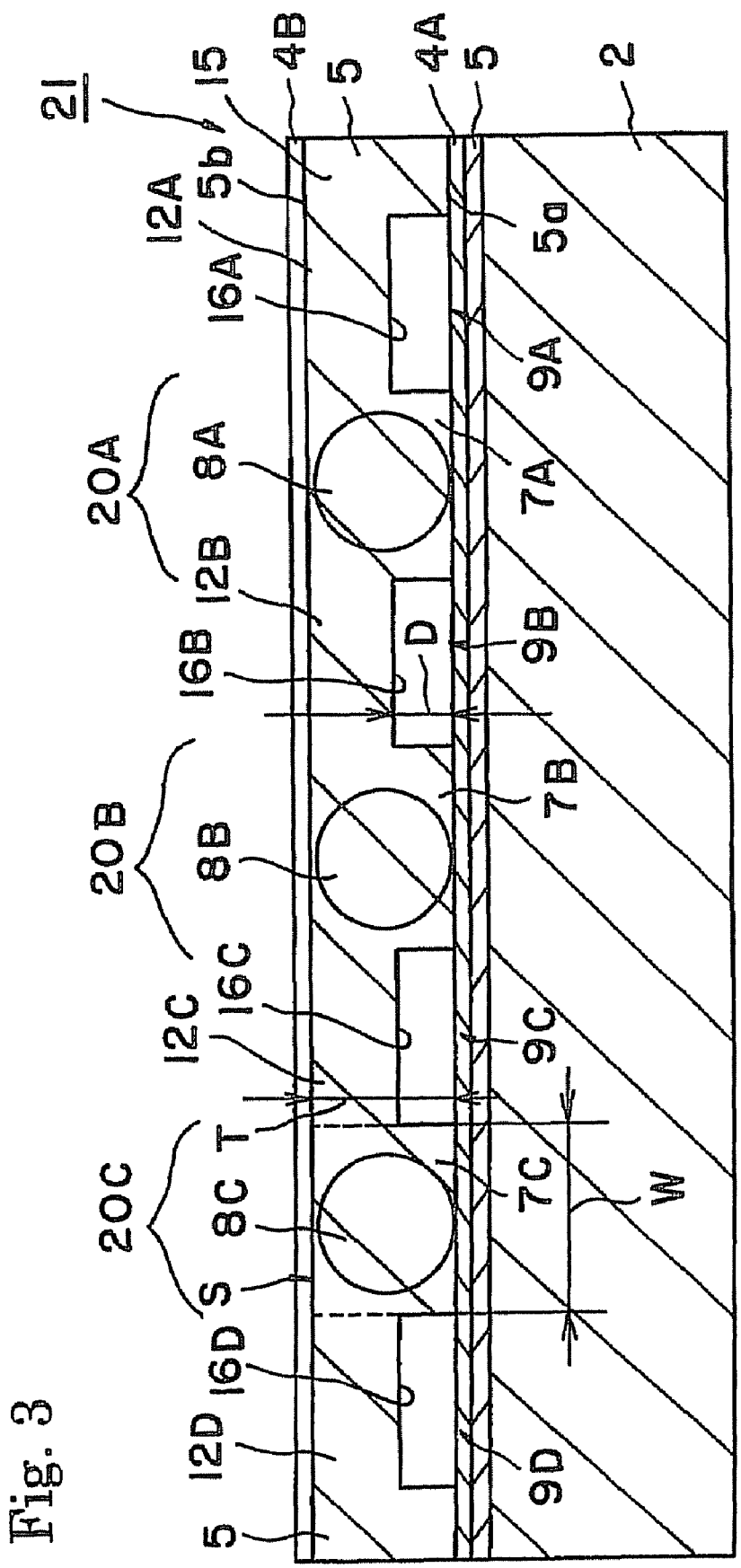
FIG. 3 is a cross sectional view schematically showing a device 21 according to still another embodiment of the present invention.
Figure 4:
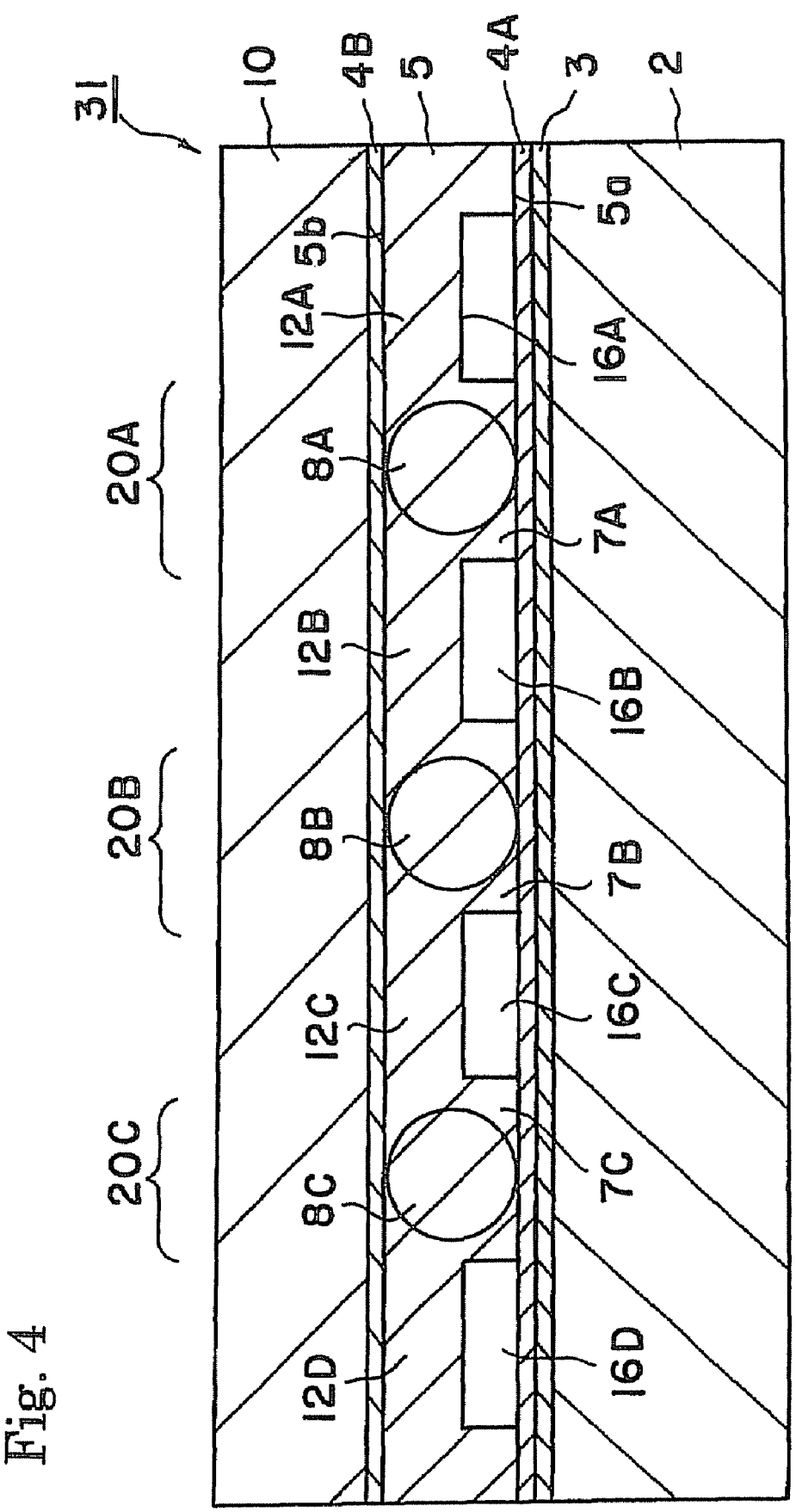
FIG. 4 is a cross sectional view schematically showing a device 31 according to still another embodiment of the present invention.

Further, according to the present invention, a plurality of wavelength converting portions may be provided in a single substrate. FIGS. 3 and 4 relate to this embodiment.

FIG. 3 is a cross sectional view schematically showing a wavelength converting device 21 according to an embodiment of the present invention. Buffer layers 4A and 4B are formed to cover main faces 5a and 5b, respectively, of a substrate 5 of an electro-optic material. Three or more grooves 16A, 16B, 16C and 16D are formed in the substrate 5. A wavelength converting portion 7A is formed between the grooves 16A and 16B, a wavelength converting portion 7B is formed between the grooves 16B and 16C, and a wavelength converting portion 7C is formed between the grooves 16C and 16D. Further, a thinner portion 12A is provided over the groove 16A, a thinner portion 12B is provided over the groove 16B, a thinner portion 12C is provided over the groove 16C and a thinner portion 12D is provided over the groove 16D. Spaces 9A, 9B, 9C and 9D are formed in the grooves 16A, 16B, 16C and 16D, respectively. The spaces may be a space filled with air, or may be vacuum, or may contain a low dielectric material as described later. A supporting body 2 is adhered to a main face 5a of the substrate 5 through an adhesive layer 3.

20A, 20B and 20C represent independent wavelength converting regions, respectively. As described above, according to this embodiment, a plurality of the wavelength converting regions may be provided in a single device to provide an array.

FIG. 4 is a cross sectional view schematically showing a wavelength converting device 31 according an embodiment of the present invention. Buffer layers 4A and 4B are formed to cover main faces 5a and 5b, respectively, of a substrate 5 of an electro-optic material. Three or more grooves 16A, 16B, 16C and 16D are formed in the substrate 5. The wavelength converting portion 7A is formed between the adjoining grooves 16A and 16B, the wavelength converting portion 7B is formed between the adjoining grooves 16B and 16C, and the wavelength converting portion 7C is formed between the adjoining grooves 16C and 16D. The supporting body 2 is adhered with a main face 5a of the substrate 5 through the adhesive layer 3. The clad body 10 is adhered with the main face 5b of the substrate 5.

According to the present invention, a pair of the thinner portions 12A, 12B, 12C and 12D are formed in the substrate 5 made of a bulk of an electro-optic material, and the wavelength converting portions 7, 7A, 7B and 7C are formed between them. Each portion has a cross sectional area "S" of 0.0001 mm$^2$ or more and 0.01 mm$^2$ or less. By increasing the cross sectional area to 0.0001 mm$^2$ or more, it is possible to prevent optical damage of the electro-optic material to obtain converted light of a high output power. On the viewpoint, the cross sectional area of the wavelength converting portion may preferably be 0.0003 mm$^2$ or more and more preferably be 0.001 mm$^2$ or more.

Further, according to the present invention, by forming the wavelength converting portion having a cross sectional area of 0.01 mm$^2$ or less, it is possible to considerably improve the conversion efficiency, compared with the case that fundamental light is made incident into the bulk substrate. On the viewpoint, the cross sectional area of the wavelength converting portion may preferably be 0.005 mm$^2$ or smaller and more preferably by 0.003 mm$^2$ or smaller.

According to the present invention, the cross sectional shape of the wavelength converting portion is not particularly limited, and includes substantially tetragonal, rectangular, parallelogram, trapezoid or the like. Further, it is provided that "T" is assigned to the thickness and "W" is assigned to the width of the wavelength converting portion, "W/T" may preferably be 1.0 or more and more preferably be 2.0 or more, on the viewpoint of improving the conversion efficiency. Further, "W/T" may preferably be 10.0 or smaller and more preferably be 8.0 or smaller.

It is provided that "T" is assigned to the thickness of the wavelength converting portion and "t" is assigned to the thickness of the thinner portion, "T/t" may preferably be 1.25 or larger and more preferably be 2.0 or larger, on the viewpoint of improving the conversion efficiency.

The following relationship is satisfied, provided that "P ω" is assigned to the power of the fundamental light and "P2ω" is assigned to the power of, for example second harmonic wave.

$$(P2\omega) \propto (P\omega)^2 \cdot L^2 / A$$

("L" represents a length of interaction of the device and not the length itself of the device, and "A" represents the cross sectional area of the beam of fundamental wave)

According to waveguide-type devices, "Pω/A" (power density of the fundamental light) has the upper limit characteristic to the material. The power density above the value causes optical damages, so that "Pω/A" cannot be increased beyond a certain value to impose a limit. Contrary to this, according to the present invention, the output power "Pω" of the fundamental wave can be further considerably improved and the conversion efficiency can be made high. "P2ω" can be thus improved to obtain an output of harmonic wave at a level which has not been realized according to prior devices.

A method for processing the ferroelectric layer for forming the grooves is not limited, and includes machining, ion milling, dry etching, laser ablation or the like.

Various kinds of systems may be used as a grinding system. It is now particularly preferred to use a grinding system called precision micro grinder owing to the high mechanical precision. Further, as a method of precision grinding, it may be applied ELID grinding (a method of grinding with dressing owing to electrolyzation). ELID grinding is a grinding process of subjecting a grinder to grinding work while the dressing is performed owing to electrolyzation, so that the processing performance is improved and stabilized.

Chemical mechanical polishing may be used as a method of finishing by surface grinding.

Alternatively, the machining may be performed by methods such as dicing or the like. According to a preferred embodiment, the groove is formed under the conditions of providing a grinder having a width of 0.1 to 0.2 mm and a mesh number of #200 to 3000 in a dicer, and of operating at a rotational rate of 10000 to 50000 rpm and a feed rate of 50 to 300 mm/min.

Laser ablation is a method of irradiating light of a wavelength or energy comparable with the connection energy between molecules constituting a material to be processed, so that the molecules are dissociated, evaporated and removed. Since this is not a thermal processing, only a laser-irradiated region can be selectively processed without affecting a region surrounding the processed region. It is thus possible to process a ridge structure at a high precision. The "laser ablation" includes the processing owing to multi photon absorption process and includes the case where thermal effect is slightly observed (Pseudo thermal process). Preferably, the kind of laser beam for the processing includes excimer laser and the fourth harmonic wave of Nd-YAG laser or the like.

According to a preferred embodiment, excimer laser is used to form the groove. In this case, laser of a high intensity of 5 to 10 J/cm² per an unit area is directly irradiated to perform rough processing of the substrate to a thickness of about 100 μm and laser of a relatively low intensity of 1 to 4 J/cm² is then used for scanning 10 to 30 times to form the groove. Alternatively, as another method, the substrate is ground and polished to a thickness of about 5 μm to obtain a thin plate, which is then scanned two to three times with laser of a relatively low intensity of 0.5 to 2 J/cm² to form the groove.

Alternatively, the groove may be formed by wet etching.

The adhesive forming the adhesive layer is not limited and includes inorganic and organic adhesives. Although specific examples of the organic adhesive are not particularly limited, it may be epoxy resin, a thermosetting resin adhesive, a ultraviolet curable resin adhesive, or "Alon ceramics C" (trade name: Supplied by To a Gosei Co. Ltd.,) having a thermal expansion coefficient (thermal expansion coefficient of $13 \times 10^{-6}$/K) near that of an electro-optic single crystal such as lithium niobate.

Further, the inorganic adhesive may preferably have a low dielectric constant and an adhesive temperature (working temperature) of about 600° C. or lower. Further, it is preferable that a sufficiently high adhesive strength can be obtained during the processing. Specifically, it may preferably be a glass having a composition of one or plural elements of silicon oxide, lead oxide, aluminum oxide, magnesium oxide, calcium oxide, boron oxide or the like.

Further, another inorganic adhesive includes, for example, tantalum pentoxide, titanium oxide, niobium pentoxide and zinc oxide.

The method of forming the inorganic adhesive layer is not particularly limited and includes sputtering, vapor deposition, spin coating, or sol-gel method.

Further, a sheet of an adhesive may be interposed between the substrate and supporting body, or between the substrate and the clad body, to join them. Preferably, a sheet of a resin adhesive of a thermosetting, photocuring or photothickening resin is interposed between the surface of the substrate and the supporting body or clad body, and the sheet is then cured. Such sheet may appropriate be a resin film having a thickness of 300 μm or smaller.

The material of the substrate with the converting portion provided is not particularly limited, and includes lithium niobate single crystal, lithium-tantalate single crystal and lithium niobate-lithium tantalite single crystal. Further, a Z-plate of a single crystal may most preferably used.

The following components may be added to the material of the substrate with the converting portion provided.

That is, for improving the resistance of the material against optical damage, the material may contain one or more element(s) selected from the group consisting of magnesium (Ng), zinc (Zn), scandium (Sc) and Indium (In). Magnesium is most preferred. Further, a rare earth element may be contained as a dopant.

The output power of the fundamental wave incident into each converting portion is not limited, and may preferably be 300 mW or larger and more preferably be 1000 mW or larger on the viewpoint of the present invention.

The material of the supporting body is not particularly limited. According to a preferred embodiment, the minimum value of the thermal expansion coefficient of the supporting body is ⅕ or larger of the minimum value of the thermal expansion coefficient of the substrate with the converting portion, and the maximum value of the thermal expansion coefficient of the supporting body is 5 times or smaller of the maximum value of the thermal expansion coefficient of the substrate with the converting portion.

When each of the electro-optic materials forming the substrate with the converting portion and supporting body has no anisotropy in thermal expansion coefficient, the minimum and maximum values of the thermal expansion coefficient are the same in each of the substrate and supporting body. When each of the electro-optic materials forming the substrate and supporting body is anisotropic in thermal expansion coefficient, the thermal expansion coefficient may be changed for the respective axes. For example, in the case that the electro-optic material forming the substrate or supporting body is lithium niobate, the thermal expansion coefficients for X axis and Y axis are $16 \times 10^{-6}$/° C., respectively, which is the maximum value. The thermal expansion coefficient in Z axis is $5 \times 10^{-6}$/° C., which is the minimum value. Therefore, the minimum value of the thermal expansion coefficient of the supporting body is made $1 \times 10^{-6}$/° C. or larger, and the maximum value of the thermal expansion coefficient of the supporting body is made $80 \times 10^{-6}$/° C. or smaller. For example, the thermal expansion coefficient of quartz glass is $0.5 \times 10^{-6}$/° C. and thus smaller than $1 \times 10^{-6}$/° C., for example.

On the above viewpoint, the minimum value of thermal expansion coefficient of the supporting body may more preferably be ½ or larger of that of the substrate with the converting portion. Further, the maximum value of thermal expansion coefficient of the supporting body may more preferably be 2 times or smaller of the maximum value of that of the substrate with the converting portion.

Specific examples of the material of the supporting body are not particularly limited, and includes lithium niobate, lithium tantalate, solid solution of lithium niobate-lithium tantalate, a glass such as quartz glass, quartz, Si or the like.

According to a preferred embodiment, the minimum value of the thermal expansion coefficient of the clad body is ⅕ or larger of the minimum value of the thermal expansion coefficient of the substrate with the converting portion, and the maximum value of the thermal expansion coefficient of the clad body is 5 times or smaller of the maximum value of the thermal expansion coefficient of the substrate with the converting portion.

When each of the electro-optic materials forming the clad body and the substrate with the converting portion has no anisotropy in thermal expansion coefficient, the minimum and maximum values of the thermal expansion coefficient are the same in each of the clad body and substrate with the converting portion. When each of the electro-optic materials forming the clad body and substrate with the converting portion is anisotropic in thermal expansion coefficient, the thermal expansion coefficient may be changed for the respective axes.

On the above viewpoint, the minimum value of thermal expansion coefficient of the clad body may more preferably be ½ or larger of that of the substrate with the conversion portion. Further, the maximum value of thermal expansion coefficient of the clad substrate may more preferably be 2 times or smaller of the maximum value of that of the substrate with the converting portion.

Specific examples of the material of the clad body are not particularly limited, and includes lithium niobate, lithium tantalate, solid solution of lithium niobate-lithium tantalate, a glass such as quartz glass, quartz, Si or the like.

Further, the clad body may be formed of a material having a high thermal conductivity such as Si. It is thereby possible to attain uniform temperature distribution in the longitudinal direction of the clad substrate so that the stability of SHG at a high output power can be improved.

Although the thickness of the clad body is not particularly limited, it may preferably be 100 μm or larger on the above viewpoint. Further, the upper limit of the thickness of the clad substrate is not particularly defined, it may preferably be 2 mm or smaller in practical view.

The kind or period of the periodic polarization domain inversion structure in the converting portion is not particularly limited, and can be appropriately selected in conformity with the wavelength of the fundamental wave to be converted. Most preferably, the periodic domain inversion structure is formed with so-called voltage application method.

EXAMPLES

Comparative Example

Periodic polarization domain inversion structure having a period of 6.60 μm was produced in a Z-cut substrate having a thickness of 500 μm and made of MgO-doped lithium niobate. The substrate was cut by a dicer to chips each having a length of 11 mm and a width of 2 mm. Both end faces of the chip was polished to obtain a device having a length of 10 mm. The device was obtained from bulk of MgO doped lithium niobate single crystal.

The optical properties of the wavelength converting device were measured. Nd:YAG laser system was used as a light source for the fundamental wave. The optical system including lenses was adjusted so that condensed beam had a diameter of 80 μm at the center of the device in its longitudinal axis. The SHG output power was 0.9 W at an input power of 6 W of the fundamental light. The conversion rate was 15 percent. The wavelength of the fundamental wave was 1.064 μm and the wavelength of the SHG light was 0.532 μm.

Example 1

The device 1 described referring to FIG. 1 was produced.

Specifically, periodic polarization domain inversion structure having a period of 6.54 μm was produced in a Z-cut substrate having a thickness of 500 μm and made of MgO-doped lithium niobate. $SiO_2$ film having a thickness of 0.5 μm was formed thereon by sputtering. Further, Mo film of a thickness of 0.5 μg/m was formed by sputtering and then patterned to produce an etching mask. Wet etching was then performed in a fluoric acid solution heated at 60° C. to form the grooves 6A and 6B. The depth "D" of the groove was 20 μm and the distance between the grooves was 50 μm.

An adhesive was applied on the substrate 2 having a thickness of 1 mm and made of non-doped lithium niobate. The substrate 2 was then adhered to the above substrate 5 of MgO-doped lithium niobate. The surface 5b of the substrate 5 of MgO-doped lithium niobate was removed by grinding and polishing to a thickness of 50 μm. $SiO_2$ film 4B having a thickness of 0.5 μm was formed by sputtering. The substrate was cut by a dicer to chips each having a length of 10 mm and a width of 1.4 mm. Both end faces of the chip was polished to obtain a device having a length of 9 mm.

The optical properties of the wavelength converting device were measured. Nd:YAG laser system was used as a light source for the fundamental wave. The optical system including lenses was adjusted so that condensed beam had a diameter of 40 μm at the end face of the device. The SHG output power was 1.5 W at an input power of 4 W of the fundamental light. The conversion rate was 37.5 percent. The wavelength of the fundamental light was 1.064 μm and the wavelength of the SHG light was 0.532 μm.

Example 2

The device 1 described referring to FIG. 1 was produced.

Periodic polarization domain inversion structure having a period of 6.54 μm was produced in a Z-cut substrate having a thickness of 500 μm and made of MgO-doped lithium niobate. $SiO_2$ film having a thickness of 0.5 μm was formed by sputtering. Further, Mo film of a thickness of 0.5 μm was formed by sputtering and then patterned to produce an etching mask. Wet etching was then performed in a fluoric acid solution heated at 60° C. to form the grooves 6A and 6B. The depth "D" of the groove was 5 μm and the distance between the grooves was 100 μm.

An adhesive was applied on the substrate 2 having a thickness of 1 mm and made of non-doped lithium niobate. The substrate 2 was then adhered to the above substrate 5 of MgO-doped lithium niobate. The surface 5b of the substrate 5 of MgO-doped lithium niobate was removed by grinding and polishing to a thickness of 10 μm. $Ta_2O_5$ film 4B having a thickness of 0.5 μm was formed by sputtering on the surface of the optical waveguide. The substrate was cut by a dice to chips each having a length of 7 mm and a width of 1.4 mm. Both end faces of the chip was polished to obtain a device having a length of 6 mm.

The optical properties of the wavelength converting device were measured. Nd:YAG laser system was used as a light source for the fundamental wave. The optical system including lenses was adjusted so that condensed beam had a width of 90 μm and a height of 9 μm at the end face of the device. The SHG output power was 1.2 W at an input power of 4 W of the fundamental light. The conversion rate was 30 percent. The wavelength of the fundamental wave was 1.064 μm and the wavelength of the SHG light was 0.532 μm.

The invention claimed is:

1. A wavelength converting device comprising a substrate comprising an electro-optic material for converting a wavelength of a fundamental light to oscillate a converted light, said device comprising:

a wavelength converting portion provided in said substrate and having a cross sectional area of 0.0001 $mm^2$ or larger and 0.01 $mm^2$ or smaller, said wavelength converting portion propagating said converted light and said fundamental light; and a pair of thinner portions provided in both sides of said wavelength converting portion, respectively, and thinner than said wavelength converting portion, wherein a space is coincident with each of said pair of thinner portions and each of said spaces is contained within said substrate.

2. The wavelength converting device of claim 1, further comprising additional portions continuously formed from said thinner portions, respectively, and thicker than said thinner portion.

3. The wavelength converting device of claim 1, further comprising a supporting body adhered to said substrate.

4. The wavelength converting device of claim 3, further comprising a clad body adhered to said substrate in a side opposite to said supporting body.

5. The wavelength converting device of claim 3, wherein said supporting body comprises a material selected from the group consisting of lithium niobate single crystal, lithium tantalate single crystal and single crystal of lithium niobate-lithium tantalate solid solution.

6. The wavelength converting device of claim 1, wherein the ratio "W/T" of the width "W" to the thickness "T" of said wavelength converting portion is 1.0 or higher and 10.0 or lower, at a cross section of said wavelength converting portion.

7. The wavelength converting device of claim 1, wherein said wavelength converting portion comprises a periodic polarization domain inversion structure.

8. The wavelength converting device of claim 1, wherein a power density at said wavelength converting portion is 2 MW/cm$^2$ or lower.

9. The wavelength converting device of claim 1, wherein said electro-optical material is selected from the group consisting of lithium niobate single crystal, lithium tantalate single crystal and single crystal of lithium niobate-lithium tantalate solid solution.

* * * * *